United States Patent
Chang et al.

(10) Patent No.: US 10,474,659 B2
(45) Date of Patent: Nov. 12, 2019

(54) LARGE SCALE NETWORK SYSTEM UPGRADE

(71) Applicant: Microsoft Corporation, Redmond, WA (US)

(72) Inventors: Le Chang, Sammamish, WA (US); Fuyuan Bie, Bothell, WA (US); Randy Thomson, Redmond, WA (US); Patrick Simek, Redmond, WA (US); Balinder Malhi, Redmond, WA (US); Lei Sun, Bellevue, WA (US); Ankur Jauhari, Bothell, WA (US); Dylan Nunley, Seattle, WA (US); Guilherme Rodrigues Nogueira de Souza, Bellevue, WA (US); Brad Smith, Sammamish, WA (US); Wei-qiang Guo, Bellevue, WA (US); Sean Lamont Grant Livingston, Bothell, WA (US); Corey Roussel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1187 days.

(21) Appl. No.: 14/318,579

(22) Filed: Jun. 28, 2014

(65) Prior Publication Data

US 2015/0379296 A1 Dec. 31, 2015

(51) Int. Cl.
*G06F 16/23* (2019.01)
(52) U.S. Cl.
CPC .................................. *G06F 16/23* (2019.01)

(58) Field of Classification Search
None
See application file for complete search history.

(56) References Cited

U.S. PATENT DOCUMENTS

| | | | |
|---|---|---|---|
| 6,405,294 B1 * | 6/2002 | Hayter | G06F 3/0601 |
| | | | 711/162 |
| 7,380,003 B1 | 5/2008 | Guo et al. | |
| 7,630,877 B2 | 12/2009 | Brown et al. | |
| 7,757,226 B2 | 7/2010 | Srivastava et al. | |
| 8,326,800 B2 | 12/2012 | Cunningham et al. | |
| 8,417,737 B2 | 4/2013 | Hopmann et al. | |
| 8,479,056 B2 | 7/2013 | Andrews et al. | |
| 8,549,144 B2 | 10/2013 | Khangaonkar et al. | |
| 8,606,752 B1 | 12/2013 | Beatty et al. | |
| 2005/0262097 A1 * | 11/2005 | Sim-Tang | G06F 17/30085 |
| 2007/0150488 A1 * | 6/2007 | Barsness | G06F 17/303 |

(Continued)

OTHER PUBLICATIONS

"The Apache HBase™ Reference Guide", Retrieved at: <<http://hbase.apache.org/book.html#hbase.binary.compatibility>>, Jan. 21, 2011, 145 pages.

(Continued)

*Primary Examiner* — Giuseppi Giuliani
(74) *Attorney, Agent, or Firm* — Liang IP, PLLC (57) ABSTRACT

In one embodiment, a network file management system 120 may use a persistent metadata store 410 and an access control list 420 to facilitate a batch rollout. The network file management system 120 may maintain a content database 312. A network file management system 120 may store a metadata set for the content database 312 in a separate persistent metadata store 410.

20 Claims, 10 Drawing Sheets

(56) References Cited

U.S. PATENT DOCUMENTS

| | | | |
|---|---|---|---|
| 2010/0106990 A1* | 4/2010 | Kalman | G06F 1/3221 713/323 |
| 2012/0089610 A1* | 4/2012 | Agrawal | G06F 17/30286 707/741 |
| 2012/0101998 A1* | 4/2012 | Cahill | G06F 17/3089 707/654 |
| 2012/0166590 A1* | 6/2012 | Nightingale | G06F 3/06 709/217 |
| 2014/0108775 A1* | 4/2014 | Kludy | G06F 9/4405 713/2 |

OTHER PUBLICATIONS

"Performing a Rolling Update of a Scalable Shared Database", Retrieved at: <<http://technet.microsoft.com/en-us/library/ms345381(v=sql.105).aspx>>, Aug. 18, 2012, 4 pages.

"Administering ASM Instances", Retrieved at: <<http://docs.oracle.com/cd/B28359_01/server.111/b31107/asminst.htm#OSTMG136>>, Nov. 24, 2011, 22 pages.

"Overview of the upgrade process to SharePoint 2013", Retrieved at: <<http://technet.microsoft.com/en-us/library/cc262483(v=office.15>>, Jul. 16, 2012, 8 pages.

"Content Matrix", Retrieved at: <<http://www.metalogix.com/Products/Content-Matrix.aspx>>, Jan. 15, 2013, 3 pages.

"Quest Migration Manager 8.10, Installation Guide", Retrieved at: <<ftp://cpe-107-015-012-234.nc.res.rr.com/AiDisk_a1/Phone_Bak/Downloads/MigrationManager_8.10_InstallGuide.pdf>>, 2013, 34 pages.

Mittal, Harsh., "Introduction to Web Deploy", Retrieved at: <<http://www.iis.net/learn/publish/using-web-deploy/introduction-to-web-deploy>>, Dec. 9, 2011, 4 pages.

"Content Matrix 6.0 Helps IT Upgrade, Migrate, and Organize SharePoint Content", Retrieved at: <<http://esj.com/articles/2012/11/07/content-matrix-6.aspx>>, Jul. 11, 2012, 2 pages.

Bie et al, "Seamless Upgrade for Network System", U.S. Appl. No. 14/292,802, filed May 30, 2014, 28 pages.

* cited by examiner

| DATABASE ID 510 | BUILD FLAG 520 | REQUESTOR ID 530 | ACCESS LEVEL 540 |
|---|---|---|---|

LARGE SCALE NETWORK SYSTEM UPGRADE

BACKGROUND

A network file management system may store a data file accessible by multiple users via a data network. The data file may be a multi-share data file, accessible to be edited by multiple users. The network file management system may be maintained by a server farm, or a set of one or more servers operating in concert to implement the network file management system. The network file management system may track any changes made to the data file by a user. Further, the network file management system may perform any conflict resolution to alleviate conflicting edits performed by multiple users. The network file management system may be upgraded to improve performance, add features, or reduce vulnerability.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a network file management system using a persistent metadata store and an access control list to facilitate a batch rollout. The network file management system may maintain a content database. A network file management system may store a metadata set for the content database in a separate persistent metadata store.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or network file management system.

During a general update rollout, control of the content database may transition from a source server farm to a target server farm implementing an updated version of the network file management system. A network file management system may process databases sequentially, to query against each of them to repopulate service lookup data, and modify each of databases for permission control. For large scale systems, some of the databases may not be in working condition, rebooting, being patched, or otherwise unavailable, slowing down or blocking the process. Additionally for large scale systems, generating metadata at runtime for each content database may be too time intensive for efficient use.

The network file management system may have a persistent metadata store and corresponding access application programming interfaces for the service lookup data, to avoid queries of each customer content database for metadata regeneration. Metadata describes data stored in the content database, while configuration data describes the configuration of a server farm accessing the content database. A persistent metadata store stores metadata even when metadata actions, such as a general update, are not being performed. The network file management system may have a shared access control model to avoid access control list changes in individual content databases. This architecture may save overhead by avoiding content database operations during a general update rollout.

The network file management data system may populate the persistent metadata store with service lookup data from individual customer databases. Service lookup data describes the location of a data file in a content database. The network file management system may provide an application programming interface to access the persistent metadata store to maintain functionalities during the runtime. Before each general update rollout, the network file management system may share the persistent metadata store with a target server farm deployment to facilitate the update.

The network file management system may maintain an access control list that associates the content database with a build flag, indicating a build version for the content database. Upon transitioning from the source server farm to the target server farm, the network file management system may update the build flag to reflect the transition, allowing any access requests to be directed through the designated server farm. The target server farm deployment may inherit the source farm credentials for running the network file management system from the source server farm. For each content database, the network management system may register a connection string in the target server farm deployment without query or modification. As both the access control list and the persistent metadata store are already available, the content database may be immediately functional upon registration of the connection string.

Thus, in one embodiment, a network file management system may use a persistent metadata store and an access control list to efficiently execute a batch rollout. The network file management system may maintain a content database. A network file management system may store a metadata set for the content database in a separate persistent metadata store. A network file management system may maintain an access control list for the content database. The access control list may associate the content database with a build flag indicating a build version for the content database.

Figure 1:
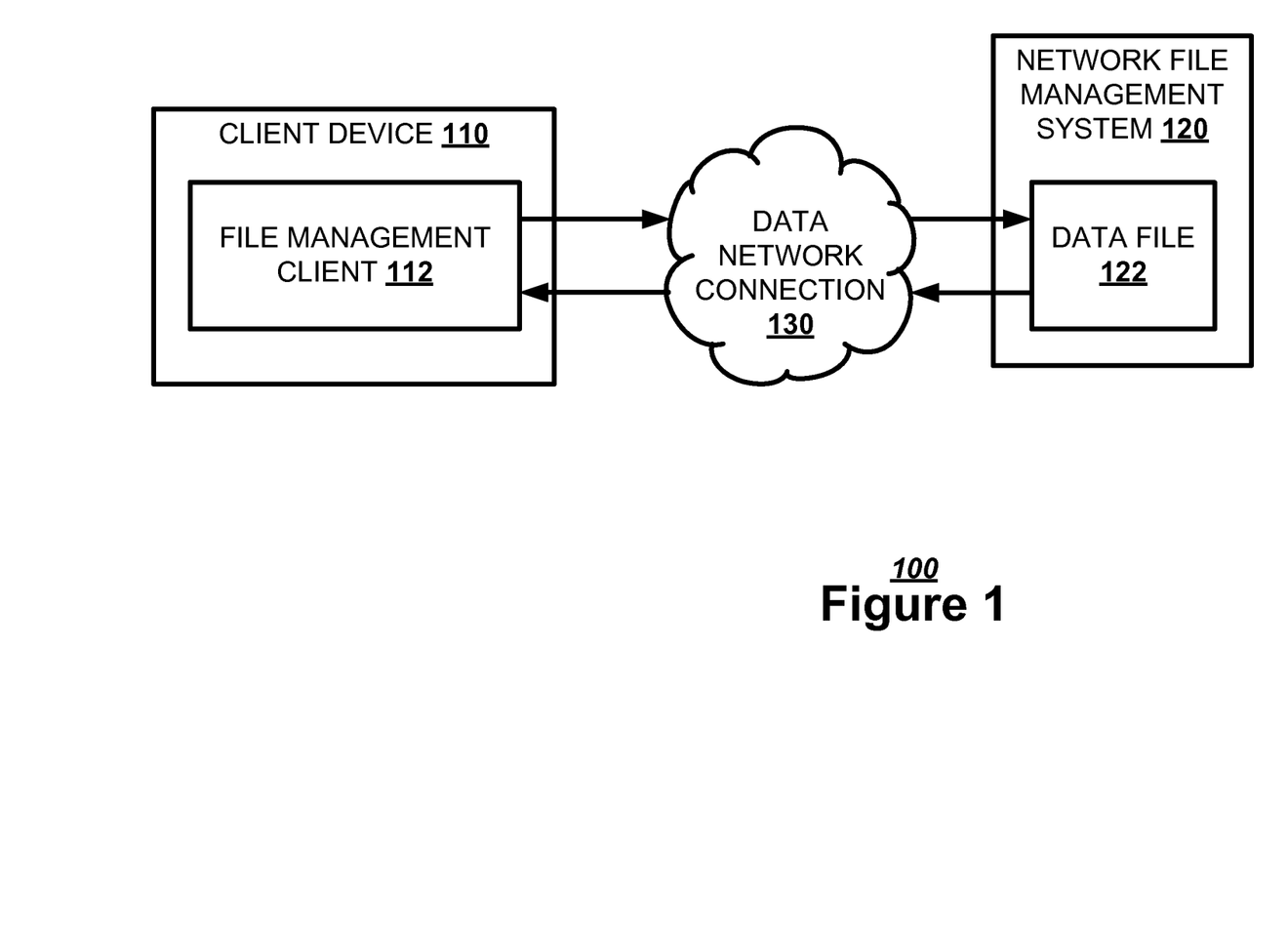
FIG. 1 illustrates, in a block diagram, one embodiment of a data network.

FIG. 1 illustrates, in a block diagram, one embodiment of a data network 100. A client device 110 may execute a network file management client 112 to connect to a network file management system 120 via a data network connection 130. The network file management client 112 may be a separate application or integrated into an operating system or an internet browser platform. The network file management system 120 may refer to a single server or a distributed set of servers that may access the cloud data set, such as a server farm. The data network connection 130 may be an internet connection, a wide area network connection, a local area network connection, or other type of data network connections. The network file management client 112 may access a data file 122 stored in the network file management system 120.

The network file management client 112 may allow a user to perform a read operation or a write operation on the data file 122 over a network. A read operation sends a copy of the data stored in the data file 122 to the client device 110. A write operation creates or deletes a data file 122 or enters changes to the data file 122 as stored in the network file management system 120.

Figure 2:
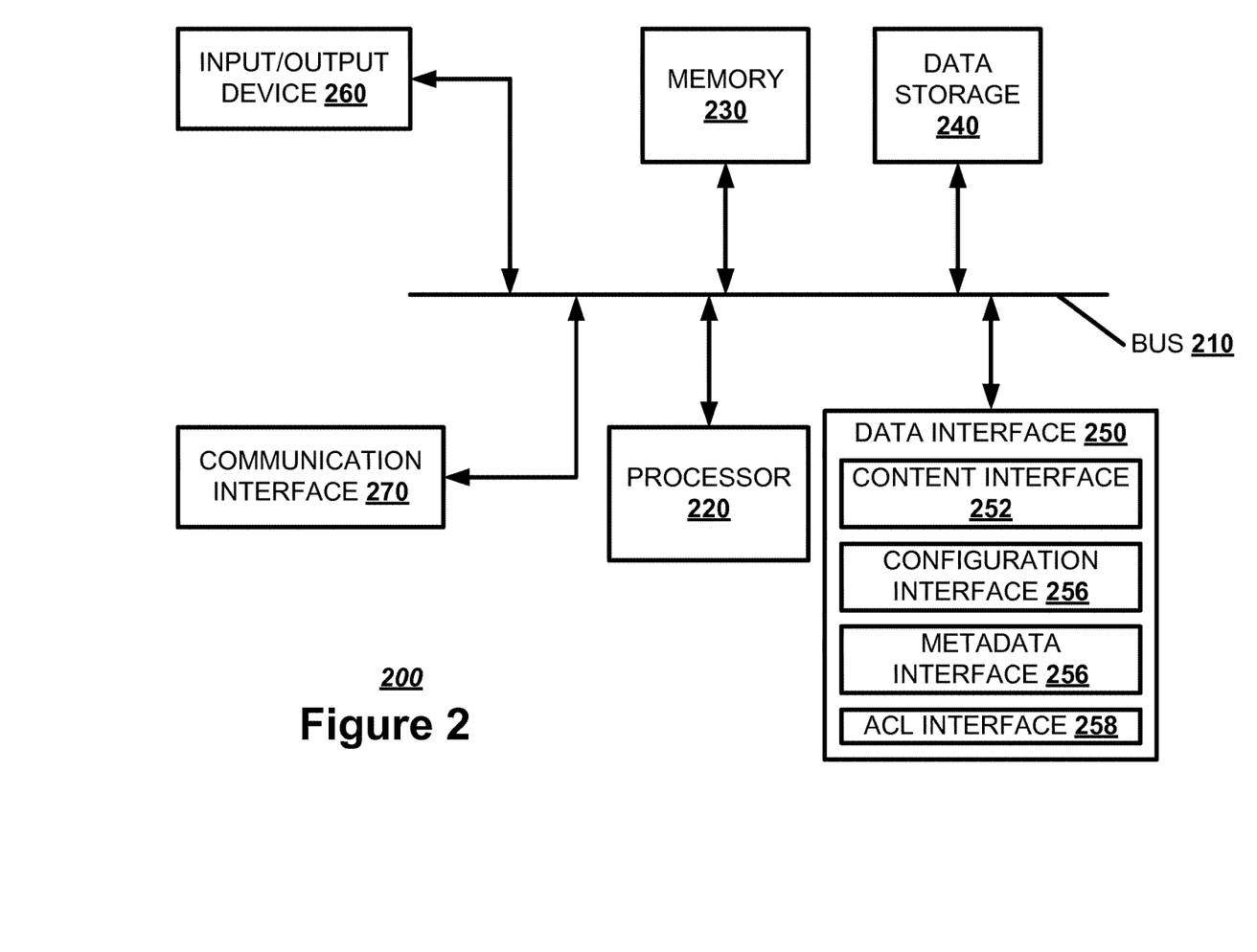
FIG. 2 illustrates, in a block diagram, one embodiment of a computing device.

FIG. 2 illustrates a block diagram of an exemplary computing device 200 which may act as a client device 110 or a server implementing a network file management system 120. The computing device 200 may combine one or more of hardware, software, firmware, and system-on-a-chip technology to implement a client device 110 or a server implementing a network file management system 120. The computing device 200 may include a bus 210, a processor 220, a memory 230, a data storage 240, a database interface 250, an input/output device 260, and a communication interface 270. The bus 210, or other component interconnection, may permit communication among the components of the computing device 200.

The processor 220 may include at least one conventional processor or microprocessor that interprets and executes a set of instructions. The memory 230 may be a random access memory (RAM) or another type of dynamic data storage that stores information and instructions for execution by the processor 220. The memory 230 may also store temporary variables or other intermediate information used during execution of instructions by the processor 220. The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to an ephemeral medium such as a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method.

The database interface 250 may connect to a database storing content, such as a data file, or a database storing configuration data, metadata, or access control data for the network file management system 120. The computing device 200 may have a content database interface 252 to interact with a content database, a server farm configuration database interface 254 to interact with a server farm configuration database, a metadata interface 256 to interact with a persistent metadata store, or an access control list (ACL) interface 258 to interact with an access control list. The computing device 200 may have a database interface 250 act as a content database interface 252, a configuration database interface 254, a metadata interface 256, an access control list interface 258, or any combination thereof.

The input/output device 260 may include one or more conventional mechanisms that permit a user to input information to the computing device 200, such as a keyboard, a mouse, a voice recognition device, a microphone, a headset, a gesture recognition device, a touch screen, etc. The input/output device 260 may include one or more conventional mechanisms that output information to the user, including a display, a printer, one or more speakers, a headset, or a medium, such as a memory, or a magnetic or optical disk and a corresponding disk drive. The communication interface 270 may include any transceiver-like mechanism that enables computing device 200 to communicate with other devices or networks. The communication interface 270 may include a network interface or a transceiver interface. The communication interface 270 may be a wireless, wired, or optical interface. The communication interface 270 may act as a database interface 250.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240 or via the database interface 250, or from a separate device via the communication interface 270.

Figure 3:
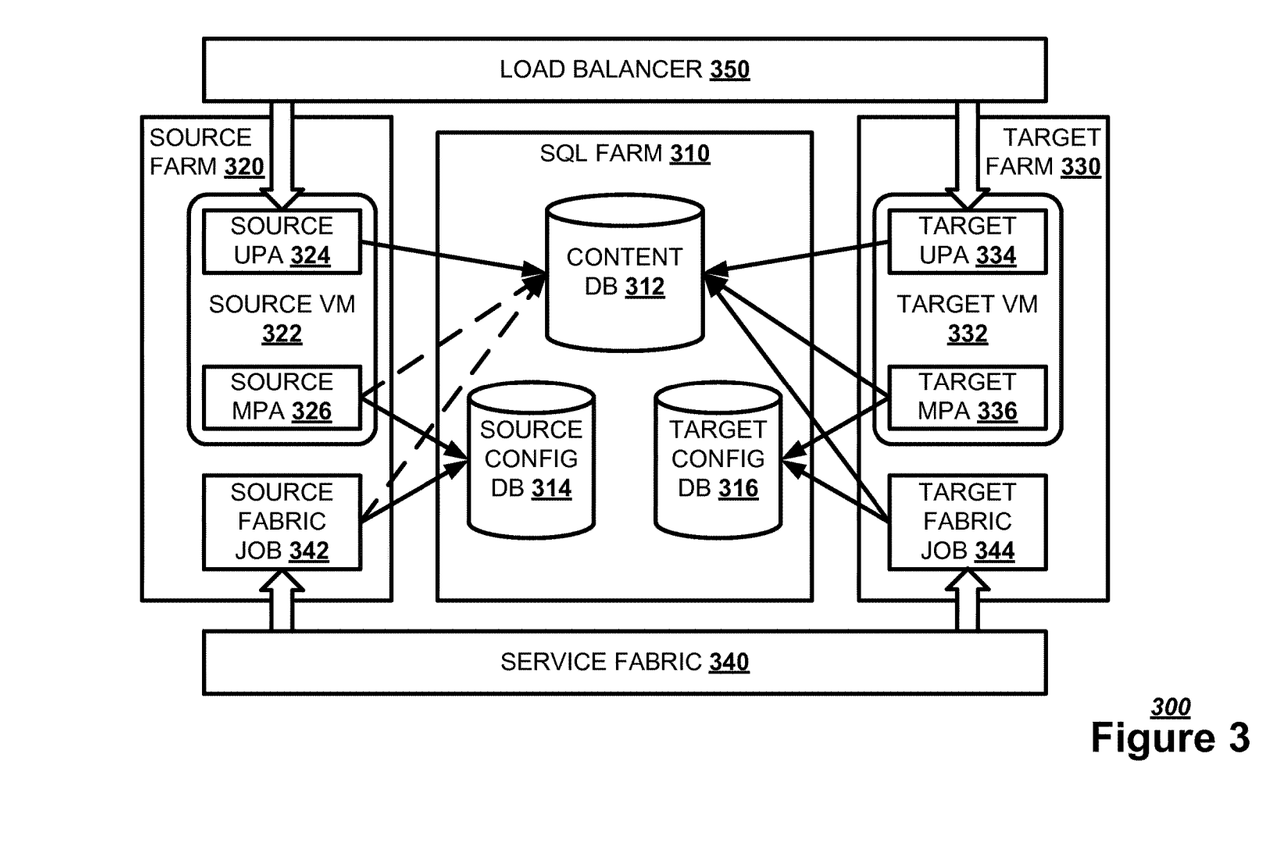
FIG. 3 illustrates, in a block diagram, one embodiment of a system architecture for a network file management system that generates metadata at the update.

To update network file management system 120 without creating significant downtime, the configuration data for a server farm may be separated out from the content data. In this configuration, however, the content data may still be used to generate metadata, such as lookup data, during the upgrade. FIG. 3 illustrates, in a block diagram, one embodiment of a system architecture 300 for a network file management system 120 upgrade that generates metadata at upgrade. The network file management system 120 may maintain a structured query language (SQL) server farm 310 having a content database 312 to store one or more data files 122. The structured query language server farm may maintain the content database 312 separate from a server farm configuration database for the server farm implementing the network file management system. The server farm configuration database may store configuration data used by a server farm to process, store, present, and manage the data files 122 stored in the content database 312, such as administrative data, formatting data, mapping data, and other data. By keeping the server farm configuration database separate from the content database 312, the server farm configuration database may be updated or changed without affecting the content database 312.

A processor 220 of the network file management system 120 may execute a virtual machine (VM) in a server farm to operate a proxy account to handle access requests to the content database 312 using configuration data from the server farm configuration database. The virtual machine may use a user proxy account (UPA) to handle access requests from the client device 110, such as read operations, write operations, worker processes, and web service application pool operations. The virtual machine may use a management proxy account (MPA) to handle access requests from a server farm, such as read operations, write operations, farm operations, and timer operations.

During a system upgrade, control of the content database 312 may transition from a source server farm 320 to a target server farm 330 implementing an updated version of the network file management system 120. A source server farm configuration database 314 may store source configuration data to manage the data files 122 in the content database 312. The network file management system 120 may have a target server farm configuration database 316 containing the source configuration data with updates and patches applied to create target configuration data. The network file management system 120 may dual-mount the content database 312 to the source server farm configuration database 314 and the target server farm configuration database 316.

A source server farm 320 may implement a source virtual machine 322 using source configuration data to access the content database 312. The source virtual machine 322 may operate a source user proxy account 324 to handle access requests from a client device 110 and a source management proxy account 326 to handle access requests from the source server farm. A target server farm 330 may implement a target virtual machine 332 using target configuration data to access the content database 312. The target virtual machine 332 may operate a target user proxy account 334 to handle access requests from a client device 110 and a target management proxy account 336 to handle access requests from the target server farm.

The network file management system 120 may have a service fabric 340. The service fabric 340 may implement various fabric jobs and internal administration jobs. The service fabric 340 may administer a set of source fabric jobs 342 from the source server farm 320. The service fabric 340 may administer a set of target fabric jobs 344 from the target server farm 330.

During the system upgrade, a load balancer 350 may receive access requests from the client device 110. Prior to a changeover point, the load balancer 350 may direct an access request to a source user proxy account 324 in the source virtual machine 322 to process, allowing the client device 110 to execute a read operation or a write operation on the data file 122. A changeover point occurs when the network file management system 120 removes a write access to the data files 122 from the source management proxy account 326 and the source fabric jobs 342. After the changeover point, the load balancer 350 redirects the access requests to a target user proxy account 334 in the target virtual machine 332 to process. Once the system upgrade is complete, the source server farm configuration database 314 may be dis-mounted from the content database 312.

Figure 4:
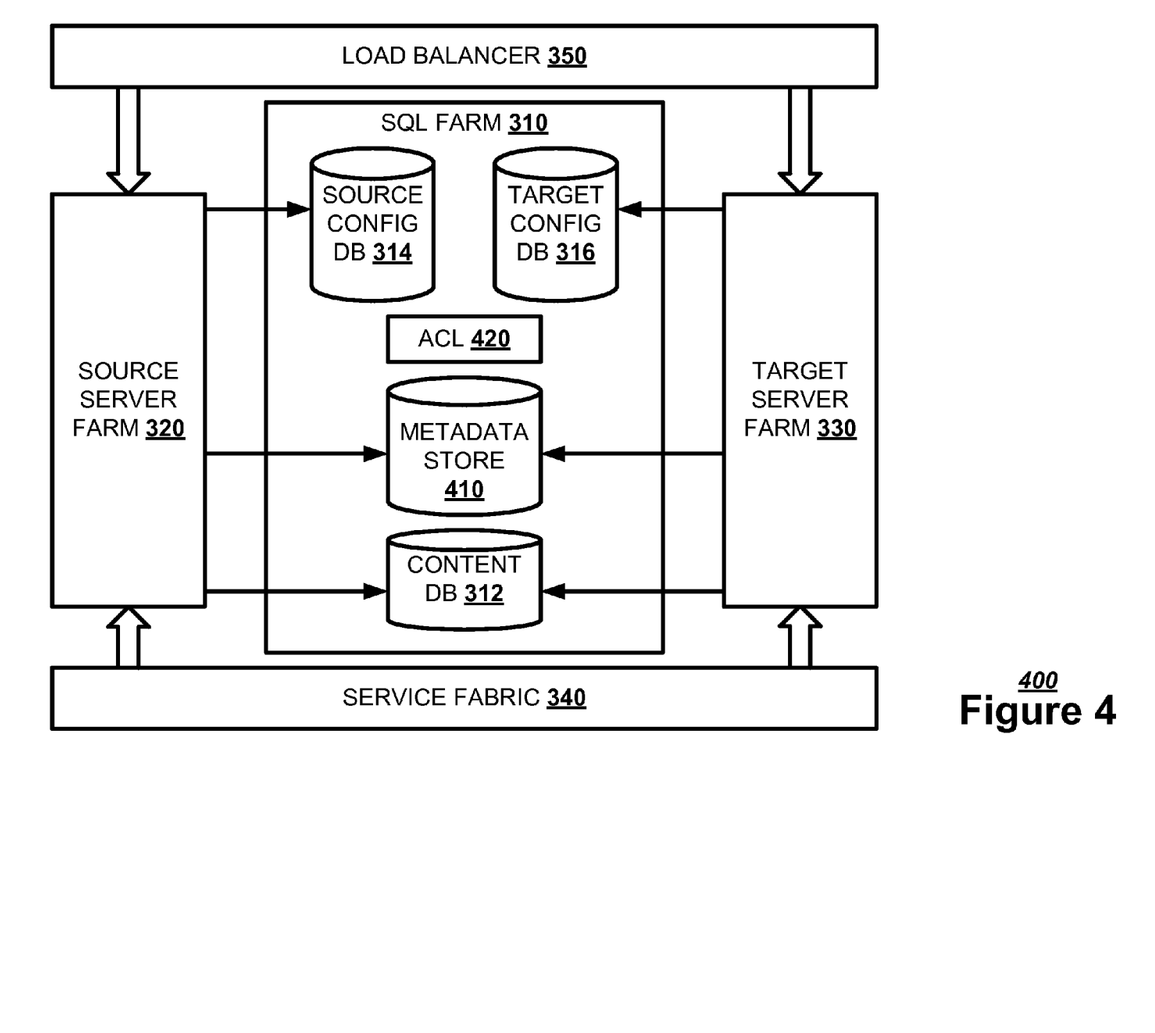
FIG. 4 illustrates, in a block diagram, one embodiment of a system architecture for a network file management system with persistent metadata handling.

The upgrade may be further streamlined by persistently storing the metadata for the content database 312. Thus, the network file management system 120 may execute a batch rollout of a general update on a server farm of the network file management system 120, updating multiple content databases simultaneously. FIG. 4 illustrates, in a block diagram, one embodiment of a system architecture 400 for a network file management system 120 with persistent storage of metadata. As when the metadata is generated at the update, a structured query language (SQL) server farm 310 may operate the network file management system 120 by maintaining a content database 312 separate from a server farm configuration database. The network file management system may transition from a source server farm 320 supported by a source server farm configuration database 314 to a target server farm 330 supported by a target server farm configuration database 316.

Additionally, the structured query language server farm 310 may maintain a separate persistent metadata store 410. The persistent metadata store 410 may store a metadata set for the content database. For example, the persistent metadata store may be populated with a service lookup data set for the content database 312, containing location data for content data in the content database 312. By using the persistent metadata store 410, the structured query language server farm 310 may execute a general upgrade whether the content database is active or accessible or not. The structured query language server farm 310 may use the persistent metadata store 410 to bequeath the source farm credentials of the source server farm 320 to the target server farm 330, avoiding the creation of separate proxy accounts for the source and the target.

Further, the structured query language server farm 310 may maintain an access control list (ACL) 420 for the content database 312. The access control list 420 may associate the content database 312 with a build flag indicating a build version for the content database 312. The load balancer 350 and the service fabric 340 may use the build flag to determine whether to direct any jobs or access requests through the source server farm 320 or the target server farm 330. The changeover point for this configuration may occur when the access control list 420 updates the build flag to indicate the target server farm 330 instead of the source server farm 320.

Figure 5:
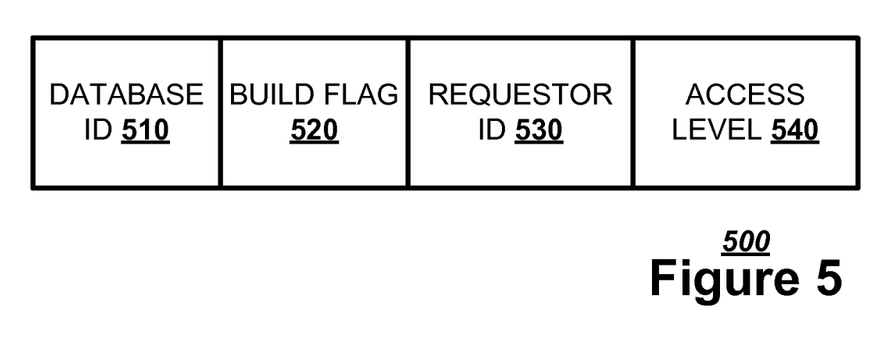
FIG. 5 illustrates, in a block diagram, one embodiment of an access control list entry.

FIG. 5 illustrates, in a block diagram, one embodiment of an access control list entry 500. The access control list entry 500 may have a database identifier (ID) 510 indicating the content database 312 referenced. The access control list entry 500 may have a build flag 520 identifying whether the identified content database 312 is associated with the source server farm 320 or the target server farm 330. Additionally, the access control list entry 500 may record a requestor identifier 530 indicating user approved for accessing the content database 312, as well as indicating an access level 540 for that user.

Figure 6:
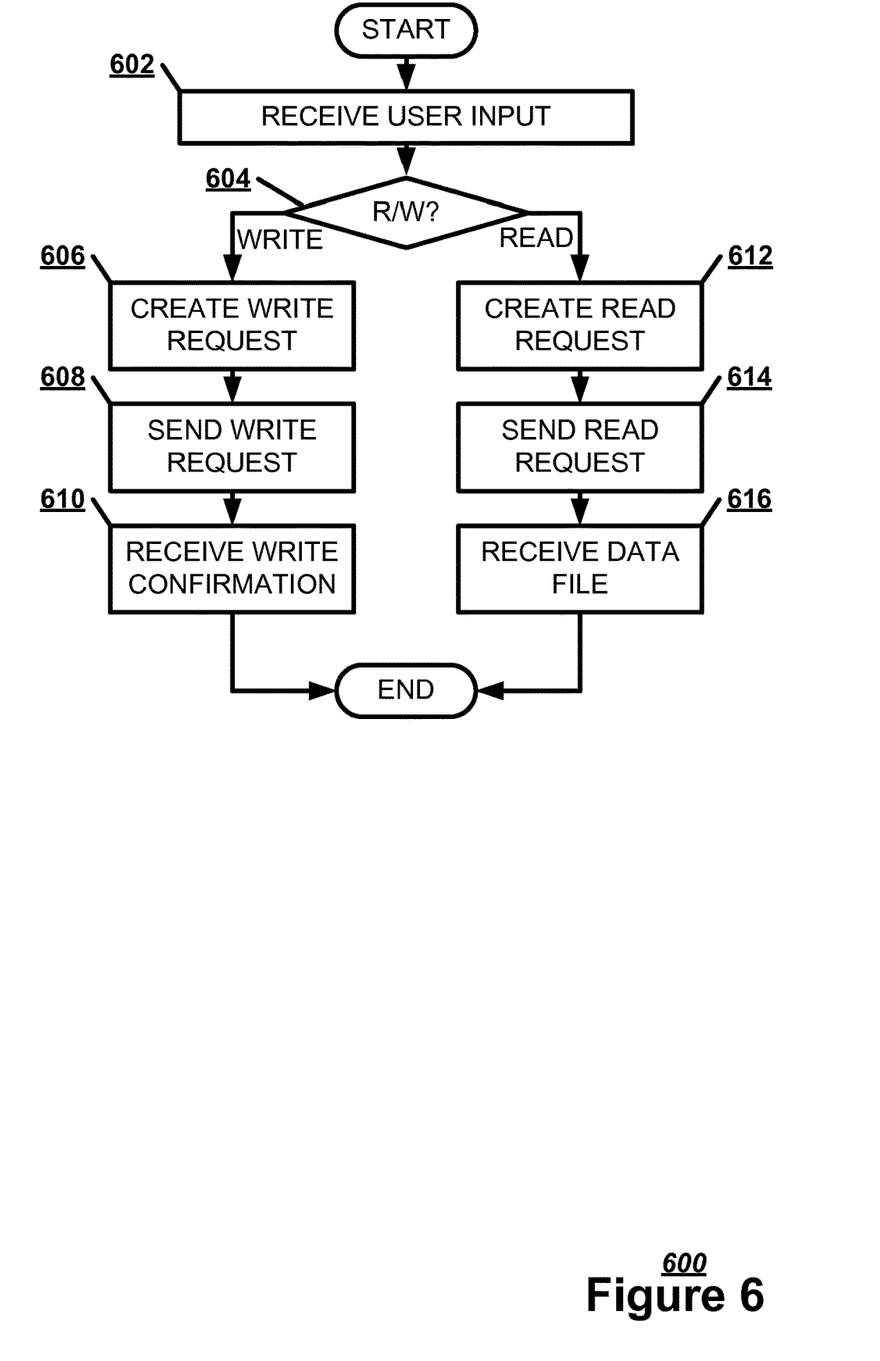
FIG. 6 illustrates, in a flowchart, one embodiment of a method for sending an access request from a client device to a network file management system.

FIG. 6 illustrates, in a flowchart, one embodiment of a method 600 for sending an access request from a client device 110 to a network file management system 120. The network file management client 112 on the client device 110 may receive a user input indicating an access request for a data file 122 stored in the network file management system 120 (Block 602). If the user input indicates a write operation request (Block 604), the network file management client 112 may create a write operation request for transmission to the network file management system 120 (Block 606). The network file management client 112 may send the write operation request to the network file management system 120 (Block 608). The network file management client 112 may receive a write confirmation from the network file management system 120 indicating that the write operation was successful (Block 610). If the user input indicates a read operation request (Block 604), the network file management client 112 may create a read operation request for transmission to the network file management system 120 (Block 612). The network file management client 112 may send the read operation request to the network file management system 120 (Block 614). The network file management client 112 may receive a copy of the data file 122 from the network file management system 120 (Block 616).

Figure 7:
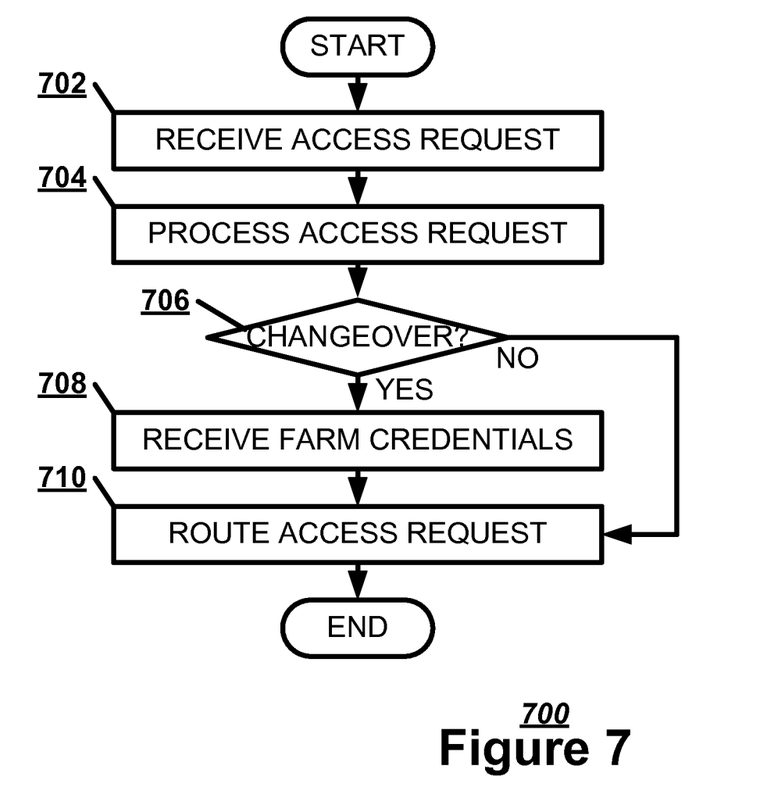
FIG. 7 illustrates, in a flowchart, one embodiment of a method for handling an access request at a load balancer of a network file management system during a system upgrade.

FIG. 7 illustrates, in a flowchart, one embodiment of a method 700 for handling an access request at a load balancer 350 of a network file management system 120 during a system upgrade. The load balancer 350 may receive an access request from the user for the content database 312 (Block 702). The load balancer 350 may process the access request to the data file 122 on a content database 312 (Block 704). If the access request is received after a changeover point (Block 706), the load balancer 350 may receive a source farm credential for use in accessing the content database via the target server farm 330 (Block 708). A changeover point is when the content database 312 is switched from the source server farm 320 to the target server farm 330 in the access control list 420. The load balancer 350 may route the access request from the user to the target server farm 330, with the target server farm 330 using a source farm credential of the source server farm (Block 710).

Figure 8:
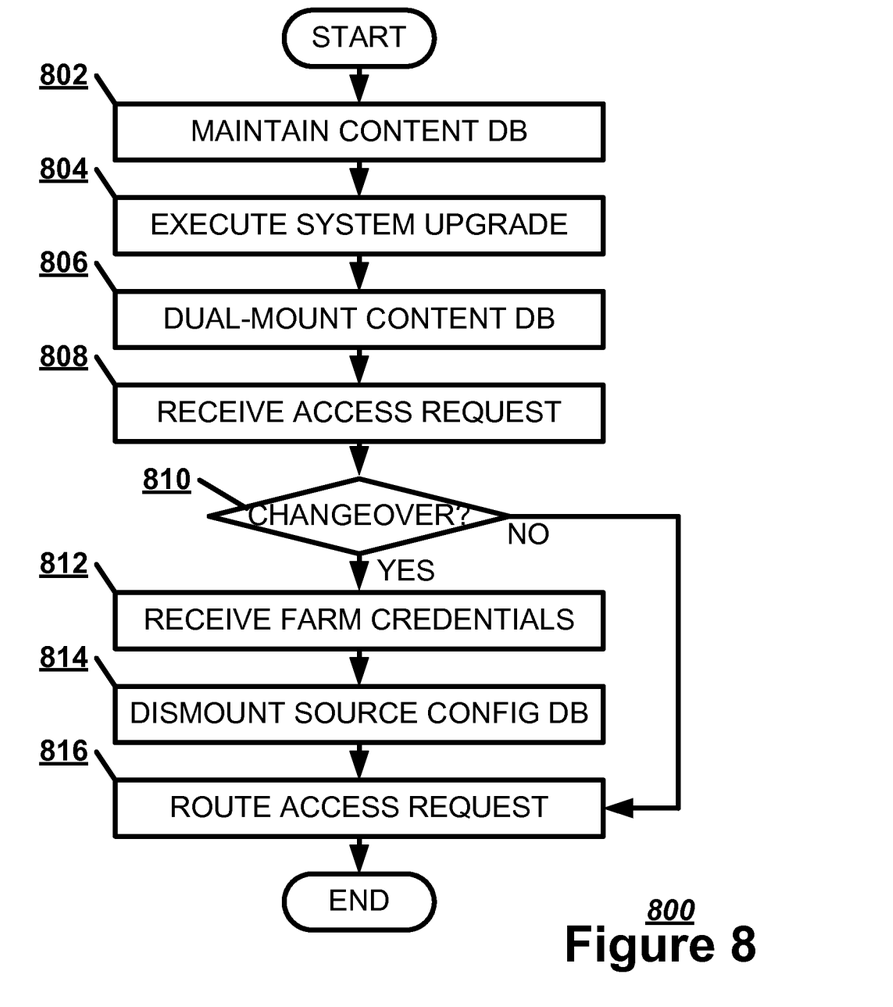
FIG. 8 illustrates, in a flowchart, one embodiment of a method for handling an access request at a service fabric of a network file management system during a system upgrade.

FIG. 8 illustrates, in a flowchart, one embodiment of a method 800 for handling an access request at a service fabric 340 of a network file management system 120 during a system upgrade. The service fabric 340 may maintain a content database 312 for the network file management system 120 separate from a source server farm configuration database 314 that stores configuration data for the network file management system 120 (Block 802). The service fabric 340 may execute a system upgrade from the source server farm configuration database 314 to a target server farm configuration database 316 that stores target configuration data for the network file management system 120 (Block 804). The service fabric 340 may dual-mount a content database 312 for the network file management system 120 to the source server farm configuration database 314 and the target server farm configuration database 316 during the system upgrade (Block 806). The service fabric 340 may receive an access request in the network file management system 120 (Block 808). If the access request is received after a changeover point (Block 810), the service fabric 340 may receive a source farm credential for use in accessing the content database via the target server farm 330 (Block 812). The service fabric 340 may dismount the source server farm configuration database 314 from the content database 312 (Block 814). The service fabric 340 may route the access request to the target server farm 330, with the target server farm 330 using a source farm credential of the source server farm (Block 816).

Figure 9:
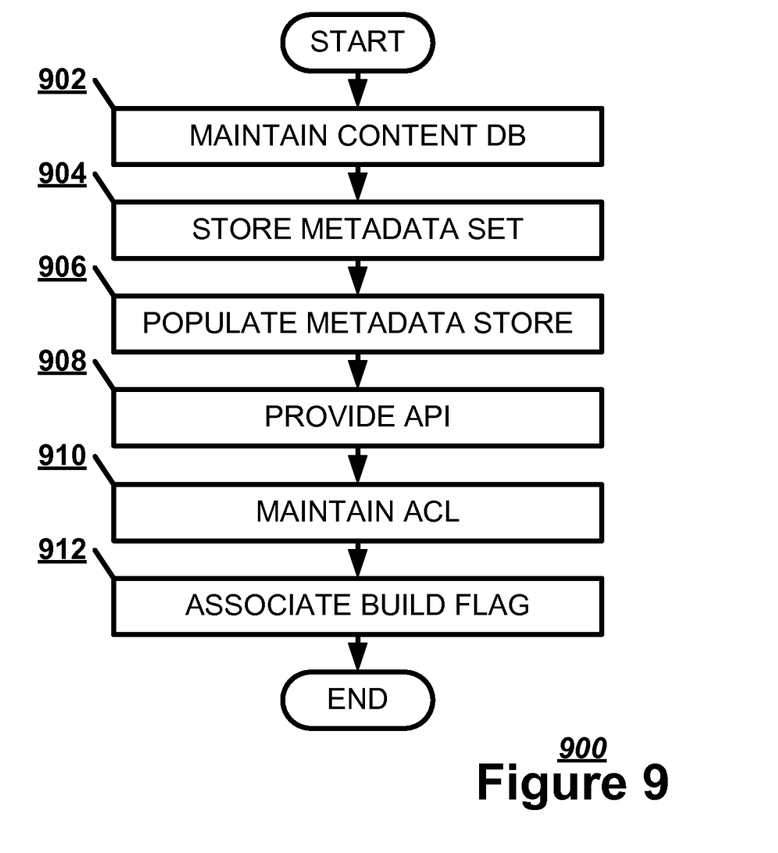
FIG. 9 illustrates, in a flowchart, one embodiment of a method for handling metadata at a structured query language server farm.

FIG. 9 illustrates, in a flowchart, one embodiment of a method 900 for handling metadata at a structured query language server farm 310. The structured query language server farm 310 may maintain a content database 312 for a network file management system (Block 902). The structured query language server farm 310 may store a metadata set for the content database 312 in a separate persistent metadata store 410 (Block 904). The structured query language server farm 310 may populate the separate persistent metadata store 410 with a service lookup data set for the content database 312 (Block 906). The structured query language server farm 310 may provide an application programming interface for the separate persistent metadata store 410 storing the metadata set for the content database 312 (Block 908). The structured query language server farm 310 may maintain an access control list 420 for the content database 312 (Block 910). The structured query language server farm 310 may associate the content database 312 with a build flag 510 indicating a build version for the content database 312 in an access control list 420 for the content database 312 (Block 912).

Figure 10:
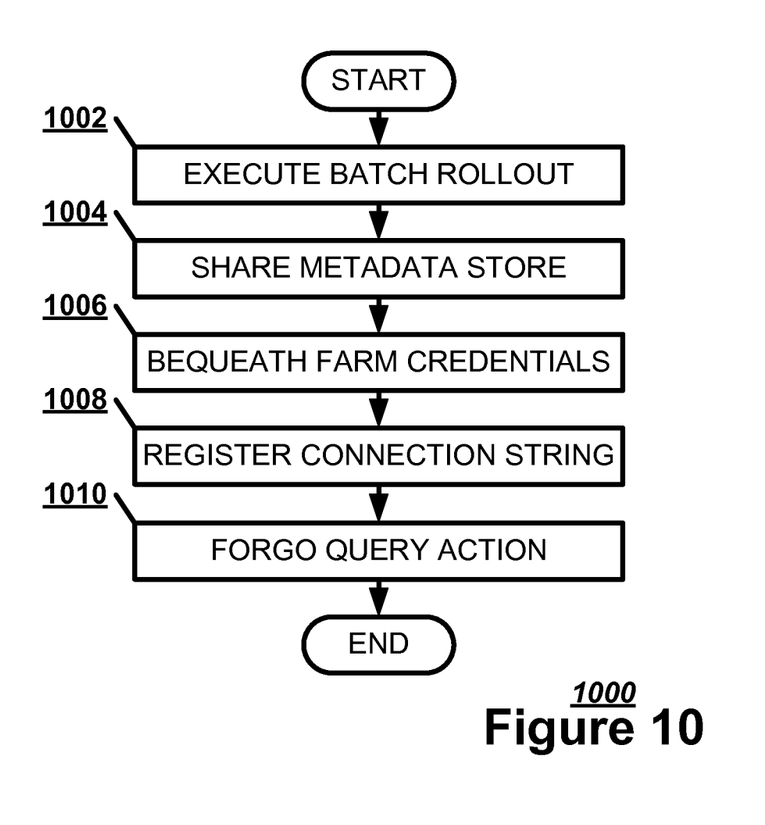
FIG. 10 illustrates, in a flowchart, one embodiment of a method for executing a system upgrade at a structured query language server farm.

FIG. 10 illustrates, in a flowchart, one embodiment of a method 1000 for executing a system upgrade at a structured query language server farm 310. The structured query language server farm 310 may execute a batch rollout of a general update on a server farm of network file management system 120 (Block 1002). The structured query language server farm 310 may share a separate persistent metadata store 410 storing a metadata set for the content database 312 with a target server farm deployment for a server farm of the network file management system 120 maintaining the content database 312 (Block 1004). The structured query language server farm 310 may bequeath a source farm credential for a source server farm 320 of the network file management system 120 maintaining the content database 312 to a target server farm deployment (Block 1006). The structured query language server farm 310 may register a connection string for the content database 312 with a target server farm deployment (Block 1008). The structured query language server farm 310 may forgo a query action on the content database while registering the connection string for the content database with a target server farm deployment (Block 1010).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A method for executing read operations in a network file management system, the method comprising:
   receiving, from a client device, a request to perform a first read operation of a data file stored in a content database containing multiple data files;
   responsive to the first read operation,
      directing, at a load balancer, the received request to a first server configured to access the data files in the content database according to first configuration data corresponding to a first version of the network file management system, the first configuration data being stored in a first configuration database separate from the content database;
      retrieving, with the first server, a copy of the requested data file from the content database according to the first configuration data; and
      transmitting, to the client device, the retrieved copy of the data file from the content database;
   receiving, from the client device, another request to perform a second read operation of the data file stored in the same content database;
   responsive to the received request, determining, at the load balancer, whether a version of the network file management system has changed from the first version to a second version;
   in response to determining that the network file management system has changed from the first version to the second version, at the load balancer,
      directing the received another request to a second server configured to access the data files in the content database according to second configuration data corresponding to the second version of the network file management system, the second configuration data being stored in a second configuration database separate from the content database and the first configuration database, wherein the first and second configuration databases are dual-mounted to the content database; and
   retrieving with the second server, another copy of the requested data file stored in the content database; and
   transmitting, to the client device, the retrieved another copy of the data file from the content database.

2. The method of claim 1, further comprising:
   maintaining an access control list for the content database, wherein the access control list includes a build flag associated with the content database, the build flag indicating a build version for the network file management system,
      wherein determining whether the version of the network file management system has changed comprises determining, based on the access control list, whether the build flag has changed from the first version to the second version.

3. The method of claim 1, further comprising:
   populating a persistent metadata store with a service lookup data set for the content database, the service lookup data set comprising locations of the data file in the content database,
      wherein retrieving the copy of the data file comprises determining a first data location for the data file based on the service lookup data set, and
      wherein retrieving the another copy of the data file comprises determining a second data location for the data file based on the same service lookup data set.

4. The method of claim 3, further comprising:
   accessing the persistent metadata store via an application programming interface with the first and second servers.

5. The method of claim 3, further comprising:
   sharing the persistent metadata store with the second server prior to determining that the version of the network file management system has changed from the first version to the second version.

6. The method of claim 3, further comprising:
   bequeathing, via the persistent metadata store, first server credentials of the first server for accessing the content database to the second server.

7. The method of claim 3, further comprising:
   registering, with the second server, a connection string for the content database.

8. A method for executing read operations in a network file management system, the method comprising:
   responsive to a user request to perform a read operation of a data file in a content database containing multiple data files, determining whether a version of the network file management system has changed from a first version to a second version;
   in response to determining that the network file management system has not changed from the first version to the second version, directing the received request to a first server configured to access the data files in the content database according to first configuration data of the first version of the network file management system to process, store, present, and manage the data files in the content database; and
   in response to determining that the network file management system has changed from the first version to the second version, at the load balancer, directing the received another request to a second server configured to access the data files in the content database according to second configuration data of the second version of the network file management system to process, store, present, and manage the data files in the content database, wherein the first and second configuration data are respectively stored in a first and second configuration database that are both separate from and dual-mounted to the content database; and retrieving with the first or second server, a copy of the requested data file stored in the content database according to the first or second configuration data, respectively; and transmitting, to the client device, the retrieved copy of the data file from the content database.

9. The method of claim 8, further comprising:

maintaining an access control list for the content database, wherein the access control list includes a build flag indicating a build version for the network file management system; and wherein determining whether the version of the network file management system has changed comprises determining, based on the access control list, whether a value of the build flag has changed from the first version to the second version.

10. The method of claim 8 wherein:

the network file management system further includes a persistent metadata store separate from the content database, the persistent metadata store containing a service lookup data set corresponding to the content database and comprising locations of the data file in the content database; and retrieving the copy of the requested data file includes:
determining a data location for the data file based on the service lookup data set in the persistent metadata store, and
retrieving the copy of the data file from the content database according to the determined data location.

11. The method of claim 10 wherein determining the data location includes:

accessing, with the first or second server, the service lookup data set in the persistent metadata store via an application programming interface.

12. The method of claim 10, further comprising:

accessing the persistent metadata store with the second server to generate the second configuration data prior to determining that the version of the network file management system has changed from the first version to the second version.

13. The method of claim 10, further comprising:

bequeathing, via the persistent metadata store, first server credentials of the first sever to the second server.

14. The method of claim 10, further comprising:

registering, with the second server, a connection string for the content database.

15. The method of claim 8, further comprising:

maintaining an access control list for the content database, wherein the access control list includes a build flag indicating a build version for the network file management system is either the first version or the second version; and upon a changeover point from the first version to the second version,
removing a write access of the first server to the data files in the content database; and
updating the build flag in the access control list from containing the first version to the second version.

16. The method of claim 8, further comprising:

maintaining an access control list for the content database, wherein the access control list includes a build flag indicating a build version for the network file management system is either the first version or the second version; and upon a changeover point from the first version to the second version,
removing a write access of the first server to the data files in the content database;
updating the build flag in the access control list from containing the first version to the second version; and
subsequently, dismounting the first configuration database from the content database.

17. A method for executing read operations in a network file management system having a load balancer, a content database storing multiple data files, and first and second servers configured to process, store, present, and manage the multiple data files in the content database according to first and second configuration data, respectively, wherein the method comprising:

responsive to a user request to perform a read operation of a data file in the content database, at the load balancer,
determining whether a build flag in an access control list of the content database containing a value indicating a first version or a second version of the network file management system;
in response to determining that the value of the build flag indicates the first version, directing the received request to the first server configured to access the data files in the content database according to the first configuration data stored in a first configuration database; and
in response to determining that the value of the build flag indicates the second version, directing the received request to the second server configured to access the data files in the content database according to the second configuration data stored in a second configuration database, wherein first and second configuration databases are dual-mounted to the content database; and retrieving, with the first or second server, a copy of the requested data file stored in the content database according to the first or second configuration data, respectively; and transmitting, to the client device, the retrieved copy of the data file from the content database.

18. The method of claim 17, further comprising:

upon a changeover point from the first version to the second version,
removing a write access of the first server to the data files in the content database; and
updating the build flag in the access control list from containing the first version to the second version.

19. The method of claim 17, further comprising:

upon a changeover point from the first server to the second server,
removing a write access of the first server to the data files in the content database;
updating the build flag in the access control list from containing the first version to the second version; and
subsequently, dismounting the first configuration database from the content database.

20. The method of claim 17 wherein:

the network file management system further includes a persistent metadata store separate from the content database, the persistent metadata store containing a service lookup data set corresponding to the content database and comprising locations of the data file in the content database; and retrieving the copy of the requested data file includes:

determining a data location for the data file based on the service lookup data set in the persistent metadata store, and retrieving the copy of the data file from the content database according to the determined data location.

* * * * *